(12) United States Patent
Muramatsu et al.

(10) Patent No.: US 6,445,886 B1
(45) Date of Patent: *Sep. 3, 2002

(54) PHOTOMETRY DEVICE OF A CAMERA

(75) Inventors: Masaru Muramatsu, Kawasaki; Tsuyako Matsushita, Yokohama, both of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/668,390

(22) Filed: Jun. 25, 1996

Related U.S. Application Data

(63) Continuation of application No. 08/186,554, filed on Jan. 26, 1994, now abandoned.

(30) Foreign Application Priority Data

Jan. 26, 1993 (JP) .............................. 5-031288
Sep. 17, 1993 (JP) .............................. 5-254829
Dec. 28, 1993 (JP) .............................. 5-352727

(51) Int. Cl.⁷ ................................ G03B 7/00
(52) U.S. Cl. ................................ 396/225
(58) Field of Search .............................. 396/271, 225, 396/296, 281

(56) References Cited

U.S. PATENT DOCUMENTS

| | | | | |
|---|---|---|---|---|
| 4,389,118 A | * | 6/1983 | Yuasa et al. | 356/404 |
| 4,511,229 A | * | 4/1985 | Schwartz et al. | 354/20 |
| 4,576,470 A | * | 3/1986 | Yuasa et al. | 355/38 |
| 4,887,121 A | * | 12/1989 | Pritchard | 354/430 |
| 5,351,080 A | * | 9/1994 | Kyuma et al. | 348/225 |
| 5,387,958 A | * | 2/1995 | Pashley | 354/227.1 |
| 5,392,088 A | * | 2/1995 | Abe et al. | 354/402 |

FOREIGN PATENT DOCUMENTS

JP          2-216422          8/1990

OTHER PUBLICATIONS

Electronics Now, vol. 65, No. 5., "Low Cost Colorimeter", pp. 45–48, J. Schnable, G. Alessandro and R. Orr, May 1994.*

* cited by examiner

*Primary Examiner*—Christopher E. Mahoney

(57) ABSTRACT

A device includes a photometry element for photometrically measuring object light while dividing the object light into a plurality of color components, and an exposure controller for calculating an exposure control value on the basis of a plurality of photometry outputs corresponding to the color components from the photometry element. In the device, the photometry element divides object light into a plurality of color components, e.g., R, G, and B three primary colors, and performs level detection in units of color components. The exposure controller preferably determines, as an exposure control value, a color component of a maximum level of the photometry outputs corresponding to the color components which are measured by the photometry element. Exposure control is executed by calculating an aperture value, a shutter speed, and the like on the basis of the determined exposure control value.

18 Claims, 11 Drawing Sheets

| D 1<br>AREA 1 | D 2<br>AREA 2 | D 3<br>AREA 3 |
|---|---|---|
| D 4<br>AREA 4 | D 5<br>AREA 5 | D 6<br>AREA 6 |
| D 7<br>AREA 7 | D 8<br>AREA 8 | D 9<br>AREA 9 |

PHOTOMETRY DEVICE OF A CAMERA

This application is a continuation of application Ser. No. 08/186,554, filed Jan. 26, 1994, now abandoned.

BACKGROUND OF THE INVENTION

1. Field of the Invention

The present invention relates to a photometry device of a camera for obtaining a proper exposure control value by photometrically measuring an object.

2. Related Background Art

As shown in FIG. 15, a conventional photometry device performs exposure control using a photometry element having spectrum sensitivity characteristics having a sensitivity peak near a wavelength of 550 nm.

Since a photometry element having the above-mentioned spectrum sensitivity characteristics has a sensitivity peak in a green region of R (red), G (green), and B (blue) as three primary colors of light, it can provide excellent exposure to an achromatic object or a green object. However, such a photometry element recognizes an object in a color close to a primary color such as red, blue, or the like to be a dark object since it has a low sensitivity to these colors.

For this reason, when an object including many red or blue components is taken, the photometry element overexposes as compared to the actual sensitivity of a color film, and as a result, a taken photograph is overexposed, resulting in a photograph with poor color reproducibility.

For example, when a scene, e.g., a dusk scene including many red components, is taken, since a conventional photometry element has a low sensitivity to red components, an overexposure occurs, and a photograph with poor red reproducibility is obtained as if a daytime scene were taken.

SUMMARY OF THE INVENTION

It is an object of the present invention to provide a photometry device of a camera, which can prevent an overexposure of an object including many single color components such as red, blue, and the like, and has good reproducibility of colors.

A photometry device of a camera according to the present invention comprises a photometry element for photometrically measuring an object while dividing object light into a plurality of color components, and exposure control means for calculating an exposure control value on the basis of a plurality of photometry outputs corresponding to the color components of the photometry element.

In the arrangement of the present invention, the photometry element divides object light into a plurality of color components, e.g., R, G, and B three primary color components, and performs level detection in units of color components. The exposure control means selects, as an exposure control value, a color component of a maximum level from photometry outputs of the color components measured by the photometry element, and performs exposure control by calculating an aperture value, a shutter speed, and the like on the basis of the selected exposure control value. For this reason, even when a scene including many single color components such as red, blue, and the like is taken, a photograph with good color reproducibility can be obtained without causing an overexposure.

Alternatively, a value obtained by weighting a plurality of photometry outputs corresponding to the color components and adding the weighted outputs may be selected as an exposure control value. In this case, it is preferable to preponderantly weight a maximum one of the plurality of photometry outputs.

Another photometry device of a camera according to the present invention comprises photometry means for dividing a photographing field into a plurality of areas, and photometrically measuring objects in the divided areas while dividing corresponding object light into a plurality of components, and exposure control means for calculating an exposure control value on the basis of a plurality of photometry outputs from the photometry means. The photometry means divides object light into a plurality of color components, e.g., R, G, and B three primary color components for each of areas obtained by dividing a photographing field, and performs level detection in units of color components. The exposure control means selects color components of maximum levels of the respective divided areas from the photometry outputs of the color components measured by the photometry means to determine an exposure control value, and performs exposure control by calculating an aperture value, a shutter speed, and the like on the basis of the determined exposure control value. For this reason, even when a scene including many single color components such as red, blue, and the like is taken, a photograph with good color reproducibility can be obtained without causing an overexposure.

Alternatively, a value obtained by weighting photometry outputs corresponding to the color components and adding the weighted outputs for each divided area may be selected as a representative value of the corresponding area, and an exposure control value may be calculated on the basis of a plurality of representative values obtained. In this case, it is preferable to preponderantly weight a maximum one of the photometry outputs in each divided area.

DETAILED DESCRIPTION OF THE PREFERRED EMBODIMENTS

Figure 1:
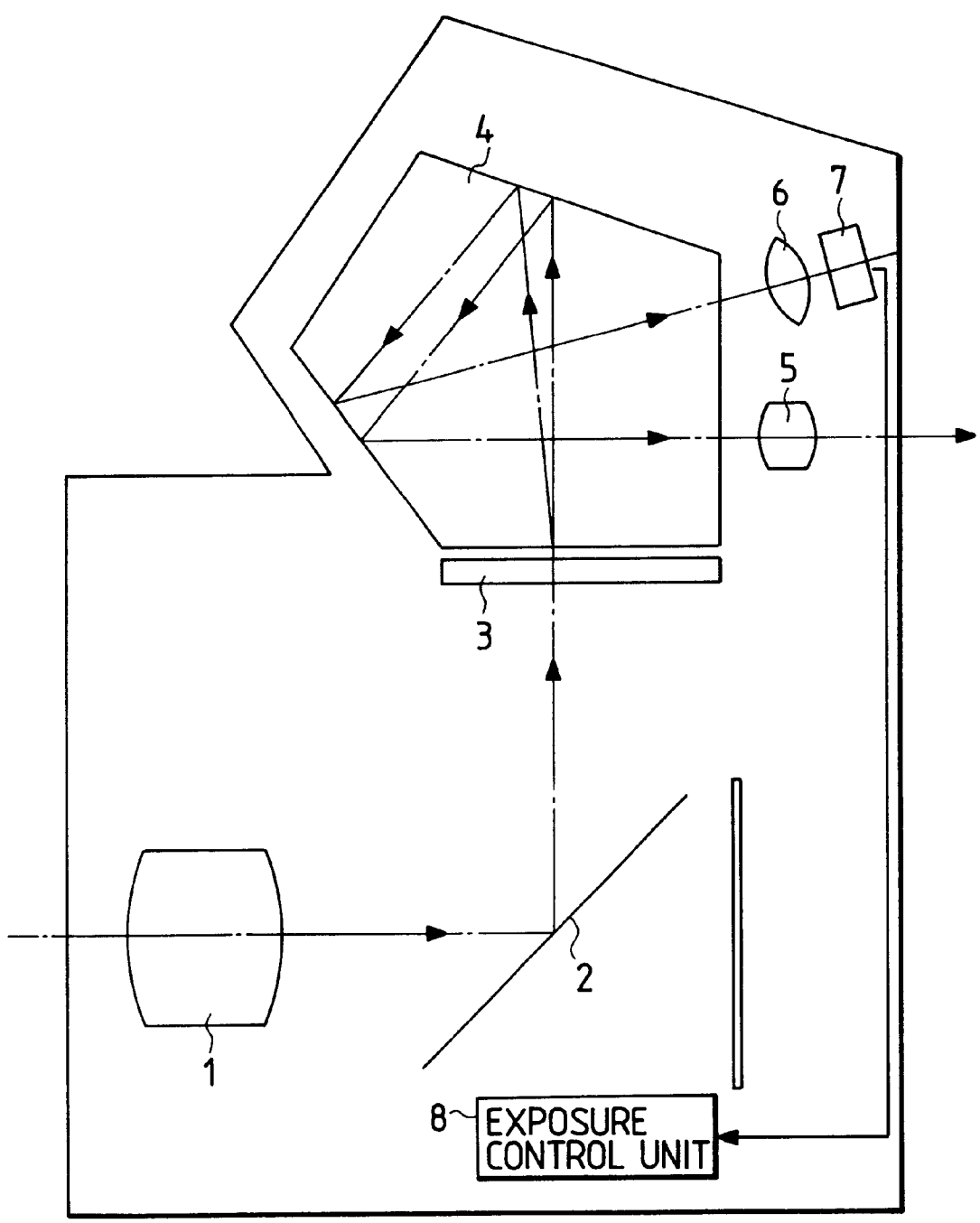
FIG. 1 is a diagram showing a photometry device of a camera according to the first embodiment of the present invention.

FIG. 1 is a diagram showing an embodiment of a camera which incorporates a photometry device according to the present invention. In this embodiment, light transmitted through a photographing lens 1 is reflected by a reflection mirror 2, and forms an image on a focusing screen 3. The image formed on the focusing screen 3 is observed by a photographer via a pentagonal prism 4 and an eyepiece lens 5. The light also forms an image on a photometry element 7 via the pentagonal prism 4 and a photometry lens 6.

Figure 2:
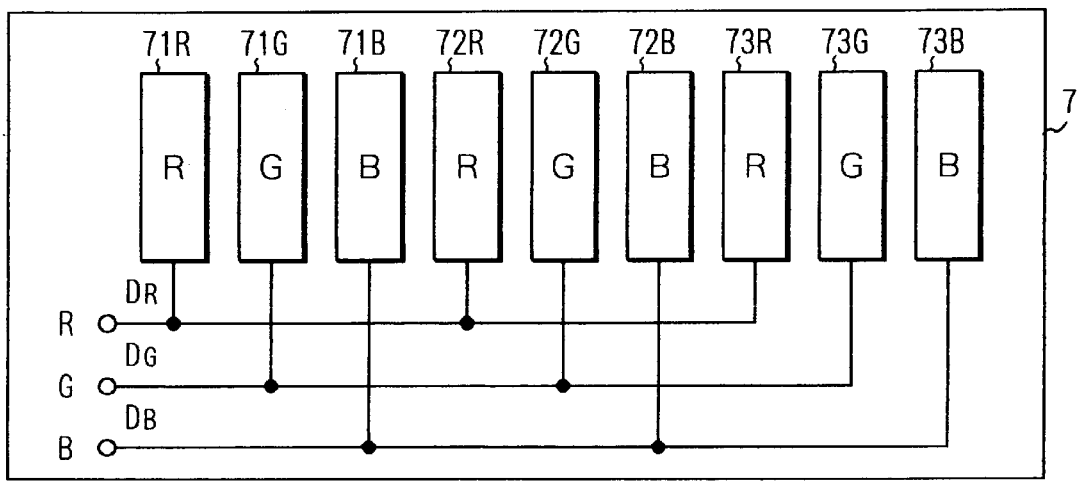
FIG. 2 is a diagram showing an example of a photometry element shown in FIG. 1.

The photometry element 7 comprises one-chip type color sensors using stripe filters. In this embodiment, R, G, and B color filters are attached to nine-divided strip-shaped photosensors 71R, 71G, 71B, 72R, 72G, 72B, 73R, 73G, and 73B, as shown in FIG. 2.

Figure 3:
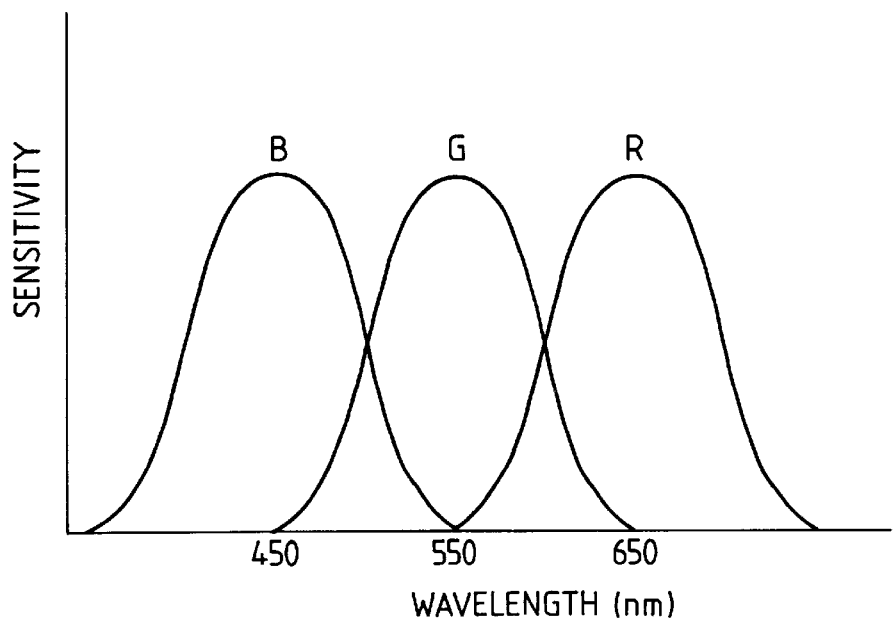
FIG. 3 is a graph showing the spectrum sensitivity characteristics of colors of the photometry element.

The spectrum sensitivity characteristics of the photosensors 71R to 73B are as shown in FIG. 3. That is, the photosensors 71B to 73B (B component) have a sensitivity peak near 450 nm, the photosensors 71G to 73G (G component) have a sensitivity peak near 550 nm, and the photosensors 71R to 73R (R component) have a sensitivity peak near 650 nm. The spectrum sensitivity characteristics can be determined in accordance with those of general films.

The photometry outputs from the photometry element 7 are added in units of colors, i.e., the photosensors 71R to 73R, the photosensors 71G to 73G, and the photosensors 71B to 73B, and the sum outputs are supplied to an exposure control unit 8 as sensor data $D_R$ of the R component, sensor data $D_G$ of the G component, and sensor data $D_B$ of the B component.

The exposure control unit 8 calculates data of a maximum level from the sensor data $D_R$, $D_G$, and $D_B$, determines it to be an exposure control value $D_O$, and performs exposure control by determining an aperture value and a shutter speed on the basis of the control value $D_O$.

In this embodiment, the photometry element 7 is constituted by the nine-divided strip-shaped photosensors for the sake of simplicity. However, in practice, the photometry element is divided into a very large number of sensors so as to fetch information of the respective color components of light, and is arranged at a position where a slightly out-of-focus state is obtained.

Figure 4:
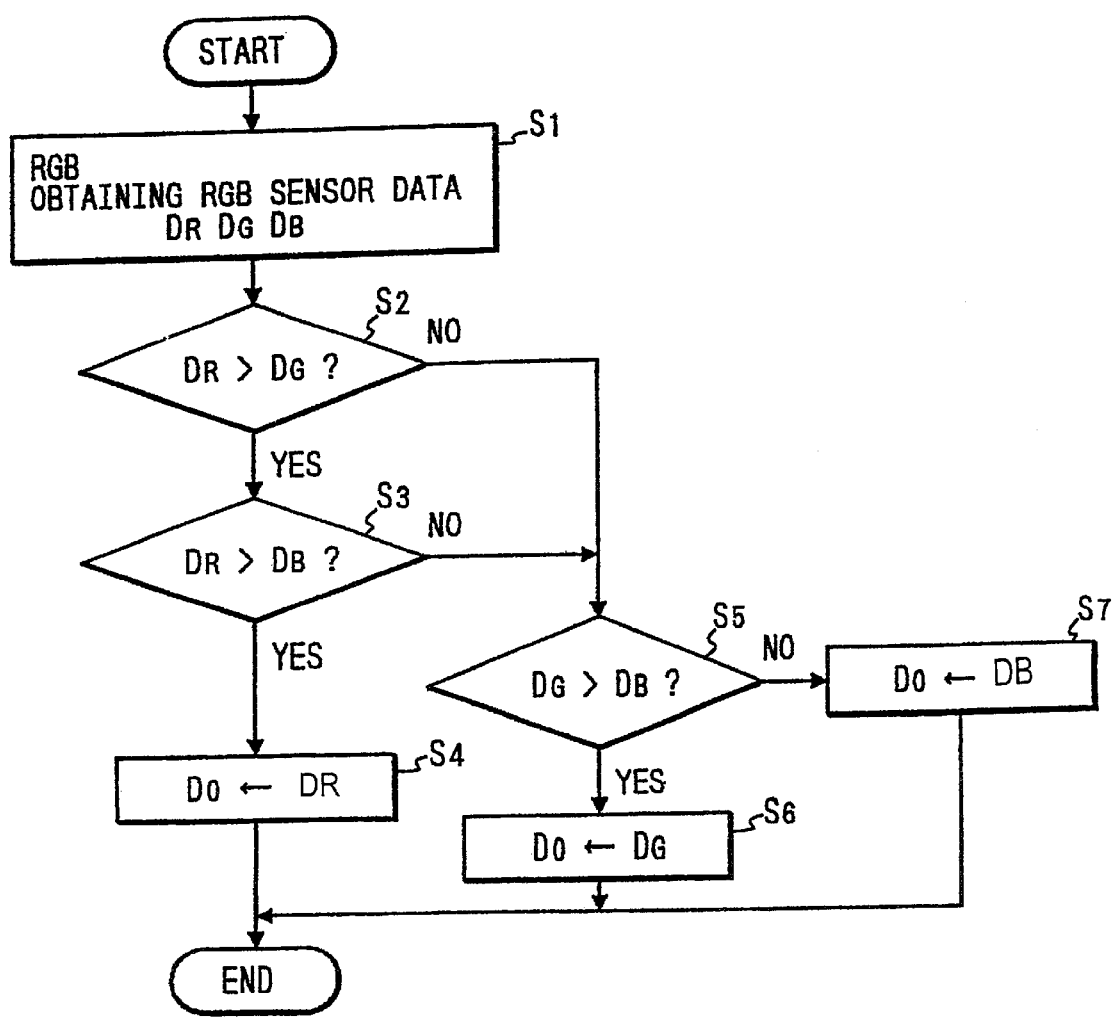
FIG. 4 is a flow chart for explaining an operation of the photometry device.

The operation of the photometry device according to the present invention will be described below with reference to the flow chart shown in FIG. 4.

The sensor data $D_R$, $D_G$ and DB of the color components R, G, and B are fetched from the photometry element 7 to the exposure control unit 8 (step S1).

Then, the sensor data $D_R$ of the R component is compared with the sensor data $D_G$ of the G component (step S2). If the sensor data $D_R$ is larger than the sensor data $D_G$, the sensor data $D_R$ is compared with the sensor data $D_B$ of the B component (step S3). As a result, if the sensor data $D_R$ is larger than the sensor data $D_B$, it is determined that the R component is largest of the color components R, G. and B, and the sensor data $D_R$ is determined to be the exposure control value $D_O$ (step S4).

If the sensor data $D_G$ of the G component is equal to or larger than the sensor data $D_R$ of the R component (step S2), or if the sensor data $D_B$ of the B component is equal to or larger than the sensor data $D_R$ of the R component (step S3), the sensor data $D_G$ of the G component is compared with the sensor data $D_B$ of the B component (step S5).

As a result, if the sensor data $D_G$ is larger than the sensor data $D_B$, it is determined that the G component is largest of the color components R, G, and B, and the sensor data $D_G$ is determined to be the exposure control value $D_O$ (step S6). If the sensor data $D_B$ is equal to or larger than the sensor data $D_G$, the sensor data $D_B$ is determined to be the exposure control value $D_O$ (step S7).

As a modification of this embodiment, a method of determining an exposure control value using weighting coefficients will be described below.

Figure 5:
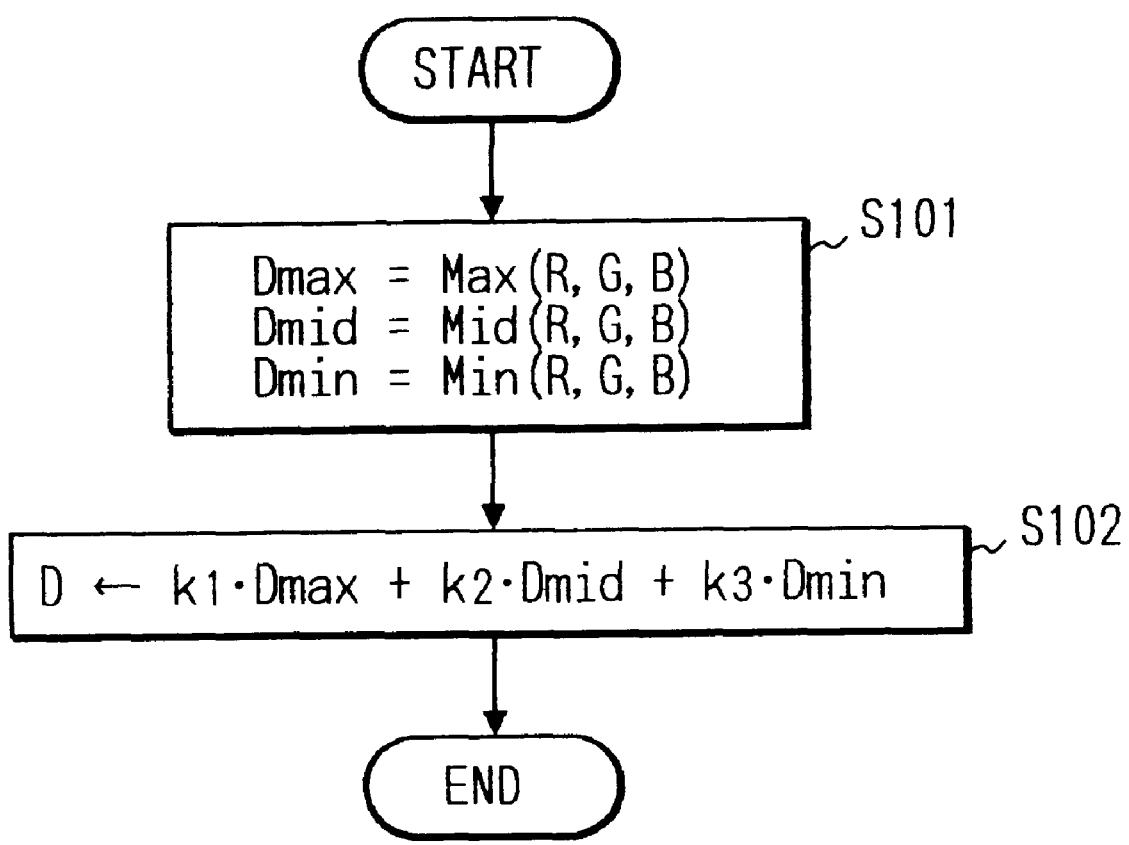
FIG. 5 is a flow chart for explaining an operation of a photometry device according to a modification of the first embodiment.

Referring to the flow chart of FIG. 5, the exposure control unit 8 calculates an output $D_{max}$ of a maximum color, an output $D_{mid}$ of a middle color, and an output $D_{min}$ of a minimum color from the sensor data $D_R$, $D_G$, and $D_B$ of the color components R, G, and B sent from the photometry element 7 (S101), and calculates a value by multiplying $D_{max}$, $D_{mid}$, and $D_{min}$ with weighting coefficients, and adding the weighted data (S102), thereby determining an exposure control value.

Note that the weighting coefficients are set to be optimal values in consideration of various photographing scenes. In general, it is preferable that a coefficient K1 for $D_{max}$ is set to be larger than K2 and K3 to preponderantly weight $D_{max}$.

Figure 6:
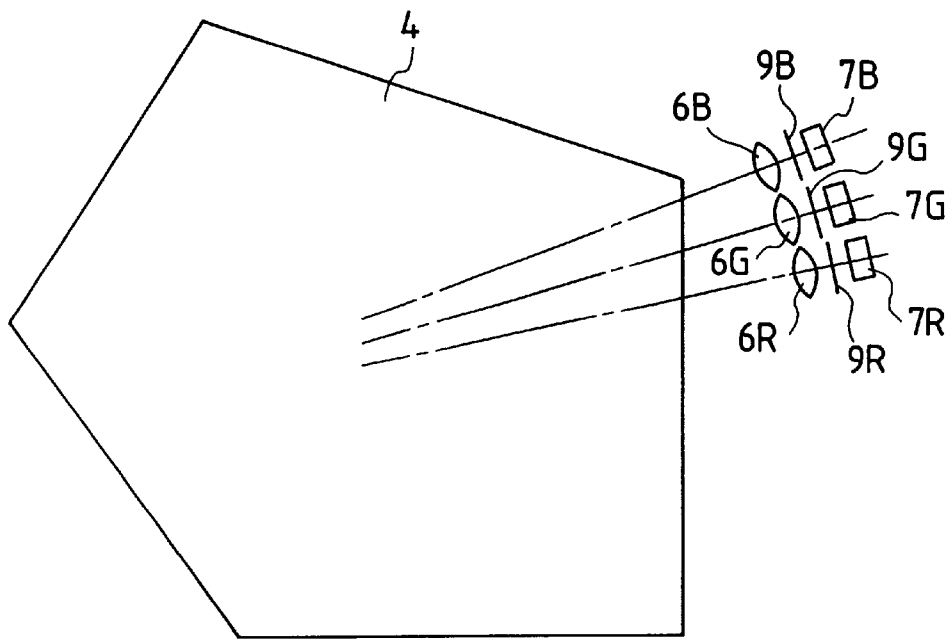
FIG. 6 is a partial view showing another arrangement of an optical system of the photometry device.

FIG. 6 shows another arrangement of a photometry optical system of the photometry device according to the present invention. In this arrangement, light components emerging from the pentagonal prism 4 are focused by three photometry lenses 6R, 6G, and 6B, and are photometrically measured by photometry elements 7R, 7G, and 7B via an R filter 9R, a G filter 9G, and a B filter 9B, which are arranged behind the photometry lenses 6R, 6G, and 6B. The outputs from the photometry elements 7R, 7G, and 7B are supplied to the exposure control unit 8 as sensor data $D_R$, $D_G$, and $D_B$. The following processing is executed according to the above embodiment or modification.

Figure 7:
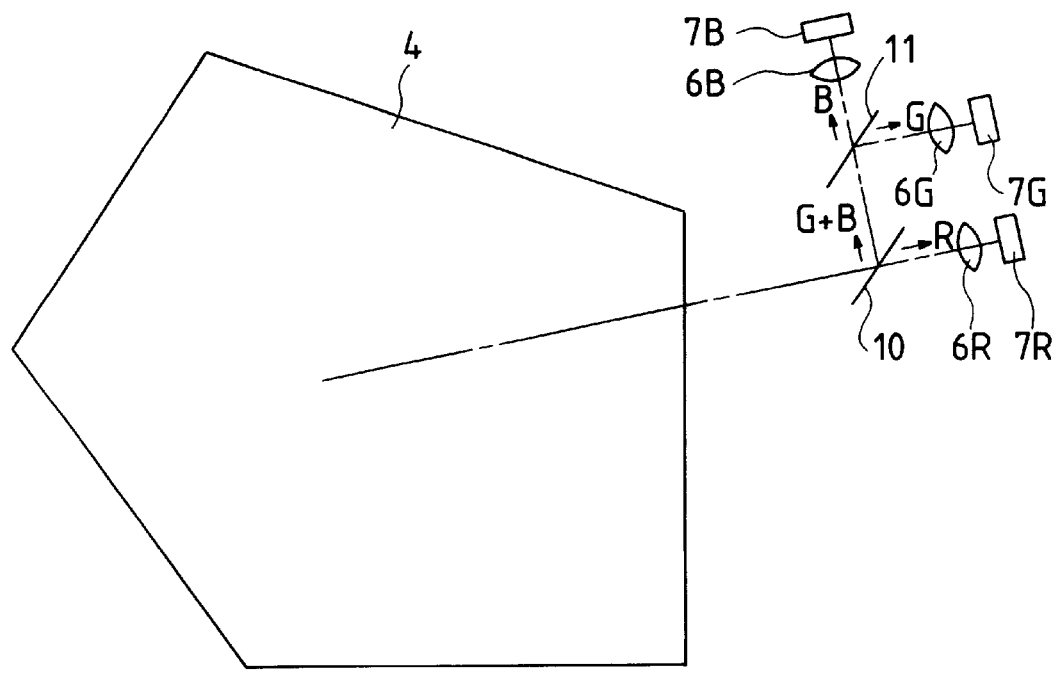
FIG. 7 is a partial view showing still another arrangement of an optical system of a photometry device.

FIG. 7 shows still another arrangement of a photometry optical system of the photometry device according to the present invention. In this arrangement, of light components emerging from the pentagonal prism 4, only an R component is transmitted through a dichroic mirror 10, and is photometrically measured by the photometry element 7R after it is focused by the photometry lens 6R. Then, of G and B components reflected by the dichroic mirror 10, the B component is transmitted through the next dichroic mirror 11, and is photometrically measured by the photometry element 7B after it is focused by the photometry lens 6B. Finally, the G component reflected by the dichroic mirror 11 is focused by the photometry lens 6G, and is photometrically measured by the photometry element 7G. The outputs from the photometry elements 7R, 7G, and 7B are supplied to the exposure control unit 8 as sensor data $D_R$, $D_G$, and $D_B$. The following processing is executed according to the above embodiment or modification.

Another embodiment of the present invention will be described below. In this device, the photographing field is divided into a plurality of areas, and spectrum photometry is executed in units of divided areas. Since the arrangement of an optical system of the device in a camera is the same as that of the embodiment shown in FIG. 1, a detailed description thereof will be omitted. Note that the photometry element 7 shown in FIG. 2 is replaced by a photometry element 7a in FIG. 8 in this device.

Figure 8:
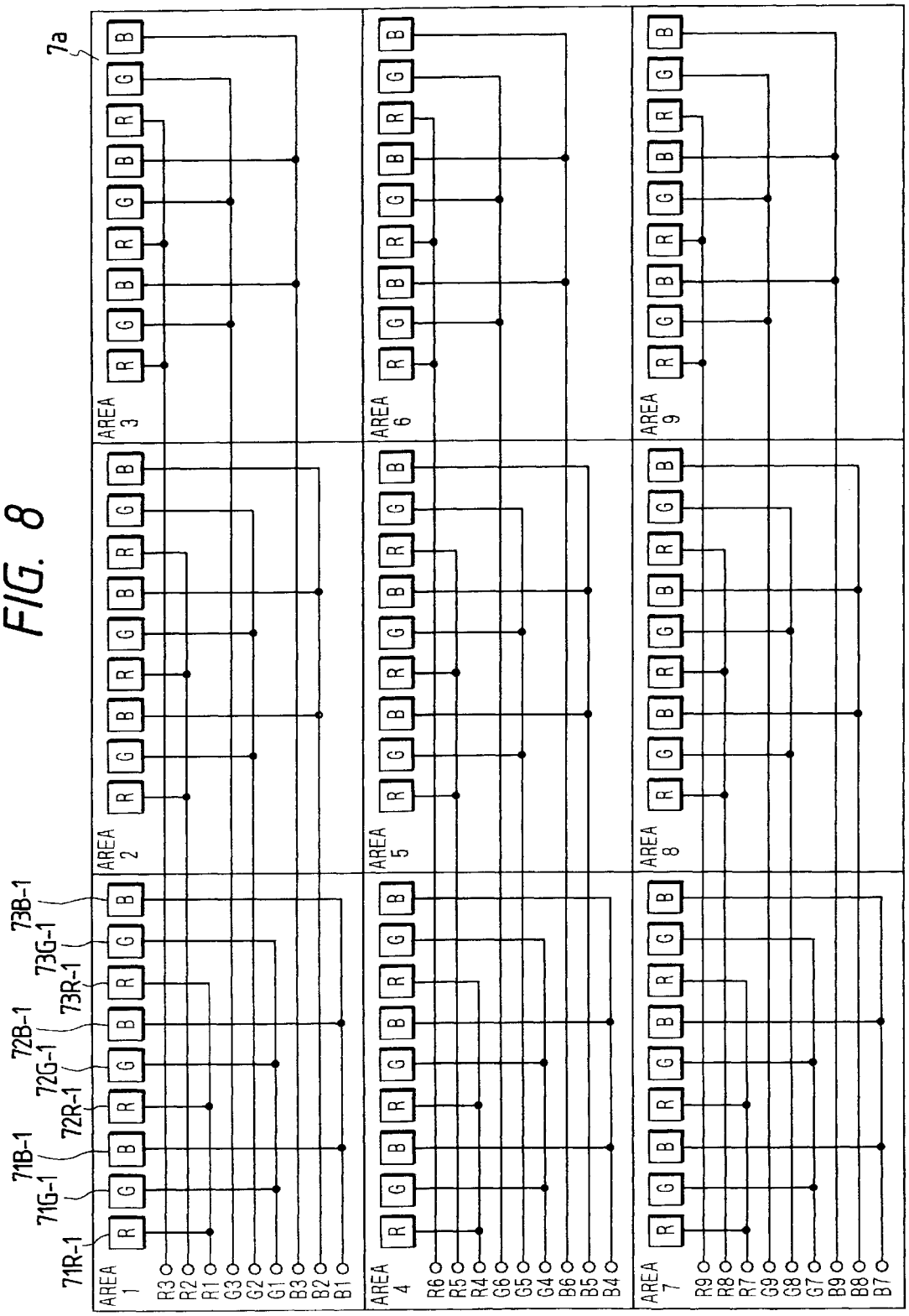
FIG. 8 is a diagram showing a photometry element of a photometry device of a camera according to the second embodiment of the present invention.

The photometry element 7a divides the photographing field into nine areas, and uses one-chip type color photosensors using stripe filters R, G, B 71R-n, 71G-n, 71B-n, 72R-n, 72G-n, 72B-n, 73R-n, 73G-n, and 73B-n (n ranges from 1 to 9 in correspondence with area numbers) for each divided area, as shown in FIG. 8. In each area, e.g., in area 1, the photometry element 7a has an arrangement in which R, G, and B color filters are attached to nine-divided strip-shaped photosensors 71R-1, 71G-1, 71B-1, 72R-1, 72G-1, 72B-1, 73R-1, 73G-1, and 73B-1. In this manner, in each of areas 1 to 9, the R, G, and B color filters are attached to the nine-divided strip-shaped photosensors 71R-1 to 73B-9, and outputs R1 to R9, G1 to G9, and B1 to B9 can be extracted in units of areas 1 to 9.

The spectrum sensitivity characteristics of the photosensors 71R-1 to 73B-9 are the same as those of the above embodiment shown in FIG. 3. That is, the photosensors 71B-1 to 73B-9 (B component) have a sensitivity peak near 450 nm, the photosensors 71G-1 to 73G-9 (G component) have a sensitivity peak near 550 nm, and the photosensors 71R-1 to 73R-9 (R component) have a sensitivity peak near 650 nm. The spectrum sensitivity characteristics can be determined in accordance with those of general films.

The photometry element 7a outputs nine each values R1 to R9, G1 to G9, and B1 to B9 in units of colors in areas 1 to 9, i.e., outputs a total of 27 photometry values, as shown in FIG. 8. Note that the photometry element is illustrated as in FIG. 8 for the sake of simplicity. However, in practice, a wiring portion is very small, and does not influence photometry.

Figures 9, 10:
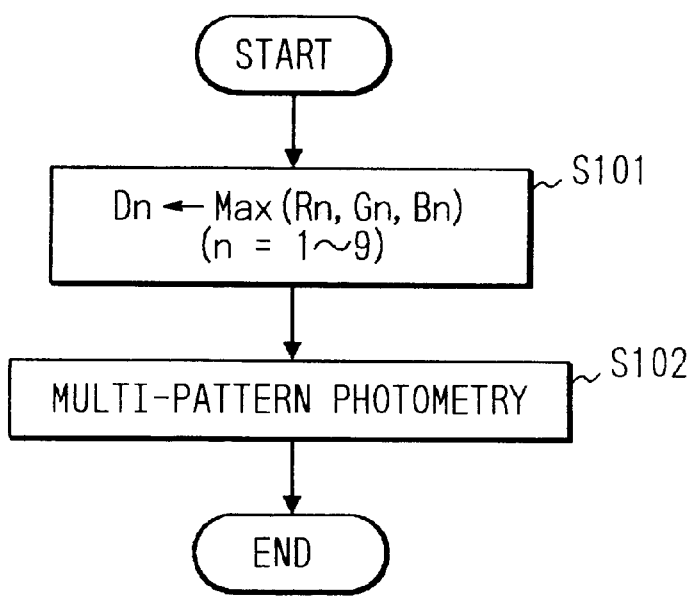
FIG. 9 is a view showing a multi-pattern photometry mode of the photometry device according to the second embodiment.
FIG. 10 is a flow chart for explaining an operation of the photometry device of the second embodiment.

As shown in the flow chart shown in FIG. 10, an exposure control unit 8 calculates data of a maximum level from sensor data DR1, DG1, and DB1 sent from area 1, and determines it as a representative value D1 of area 1, and similarly calculates representative values D2 to D9 of other areas (S101). As shown in FIG. 9, the exposure control unit 8 performs multi-pattern photometry described in Japanese Patent Publication No. 4-5972 on the basis of the representative values D1 to D9 (S102), thereby determining an exposure control value.

Figure 11:
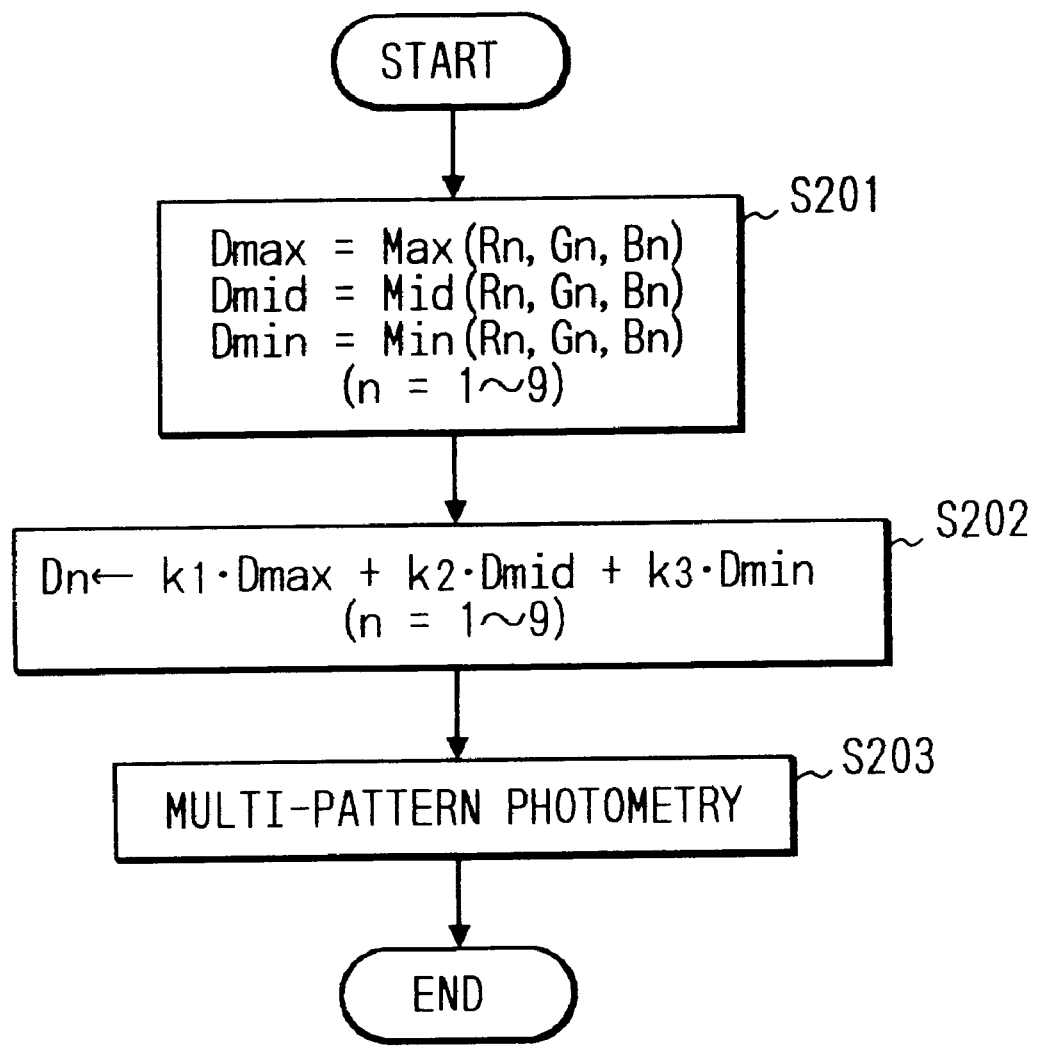
FIG. 11 is a flow chart for explaining an operation according to a modification of the second embodiment.

As a modification of this embodiment, another method of calculating the representative values of areas will be described below. Referring to the flow chart in FIG. 11, the exposure control unit 8 calculates an output $D_{max}$ of a maximum color, an output $D_{mid}$ of a middle color, and an output $D_{min}$ of a minimum color from the colors of DR1, DG1, and DB1 sent from area 1, and similarly calculates $D_{max}$, $D_{mid}$, and $D_{min}$ of respectively areas (S201). The exposure control unit 8 calculates a representative value D1 of area 1 by multiplying $D_{max}$, $D_{mid}$, and $D_{min}$ of area 1 with weighting coefficients, and adding the weighted data, and similarly calculates representative values D2 to D9 of other areas (S202). As shown in FIG. 9, the exposure control unit 8 executes multi-pattern photometry described in Japanese Patent Publication No. 4-5972 on the basis of the representative values D1 to D9 (S203), thereby determining an exposure control value. Note that the weighting coefficients are set to be optimal values in consideration of various photographing scenes. In general, it is preferable that a coefficient K1 for $D_{max}$ be set to be larger than K2 and K3 to preponderantly weight the maximum output $D_{max}$ of each area.

Figure 12A:
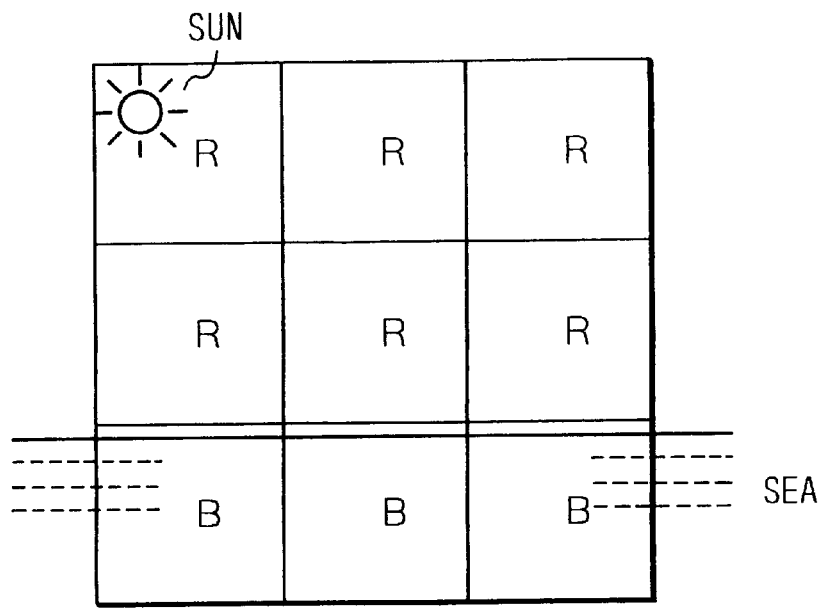
FIGS. 12A and 12B are views for comparing a multi-pattern photometry mode (FIG. 12A) of the second embodiment with a conventional multi-pattern photometry mode (FIG. 12B)
Figure 12B:
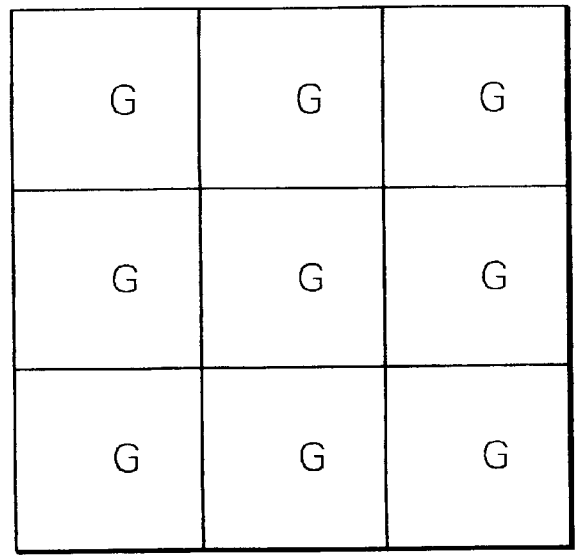
Figure 15:
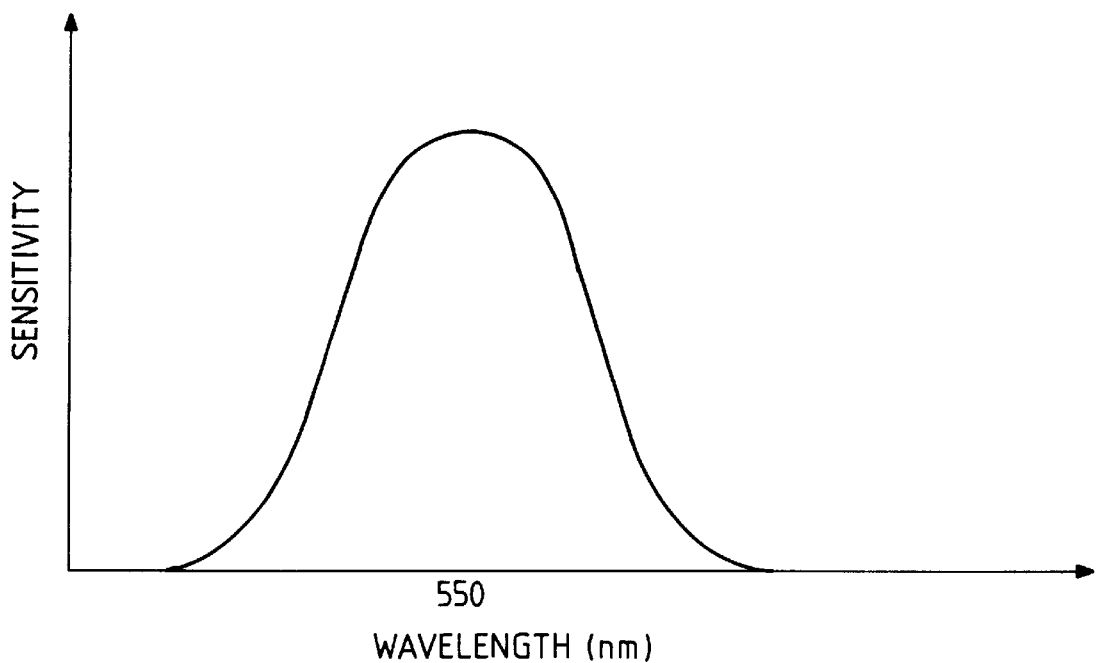
FIG. 15 is a graph showing the spectrum sensitivity characteristics of a conventional photometry element.

In conventional multi-pattern photometry, as shown in FIG. 12B, luminance levels are detected in units of divided areas, and a photometry element having sensitivity characteristics to a G component, as shown in FIG. 15, is used. In this embodiment, as shown in FIG. 12A, a luminance value of each area is determined by a representative color component (a color corresponding to a maximum output) of the corresponding area, and is used as an input value of multi-pattern photometry. Therefore, although data to be processed by the multi-pattern photometry are the same as those in the conventional multi-pattern photometry, and a conventional algorithm can be applied as it is, a photograph with good color reproducibility can be taken at low cost.

In this embodiment, each area of the photometry element 7a is constituted by the nine-divided strip-shaped photosensors. However, in practice, in order to uniformly fetch information of color components of light incident on each area, it is preferable that each area be divided into a larger number of photosensors, and the photosensors be arranged at a position where a slightly out-of-focus state is obtained.

Figure 13:
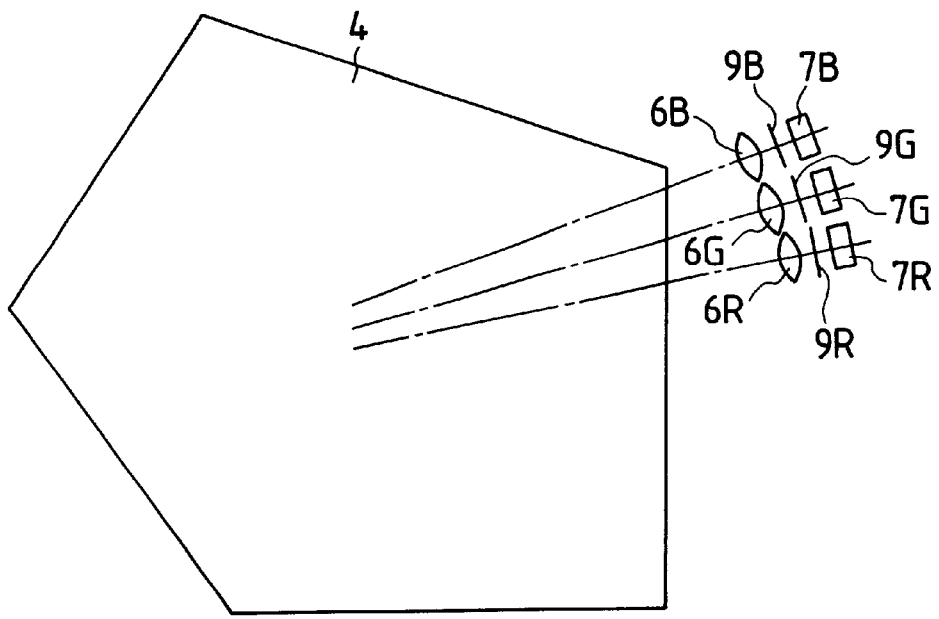
FIG. 13 is a partial view showing another arrangement of an optical system of the photometry device of the second embodiment.

FIG. 13 partially shows another arrangement of a photometry optical system of this device. In this arrangement, light components emerging from the pentagonal prism 4 are focused by three photometry lenses 6R, 6G, and 6B, and are photometrically measured by nine-divided photometry sensors 7R, 7G, and 7B via corresponding ones of an R filter 9R, a G filter 9G, and a B filter 9B, which are arranged behind the photometry lenses 6R, 6G, and 6B, as shown in FIG. 9, thereby obtaining a total of 27 photometry outputs in units of three colors from nine areas. The following processing is executed according to the second embodiment or its modification.

Figure 14:
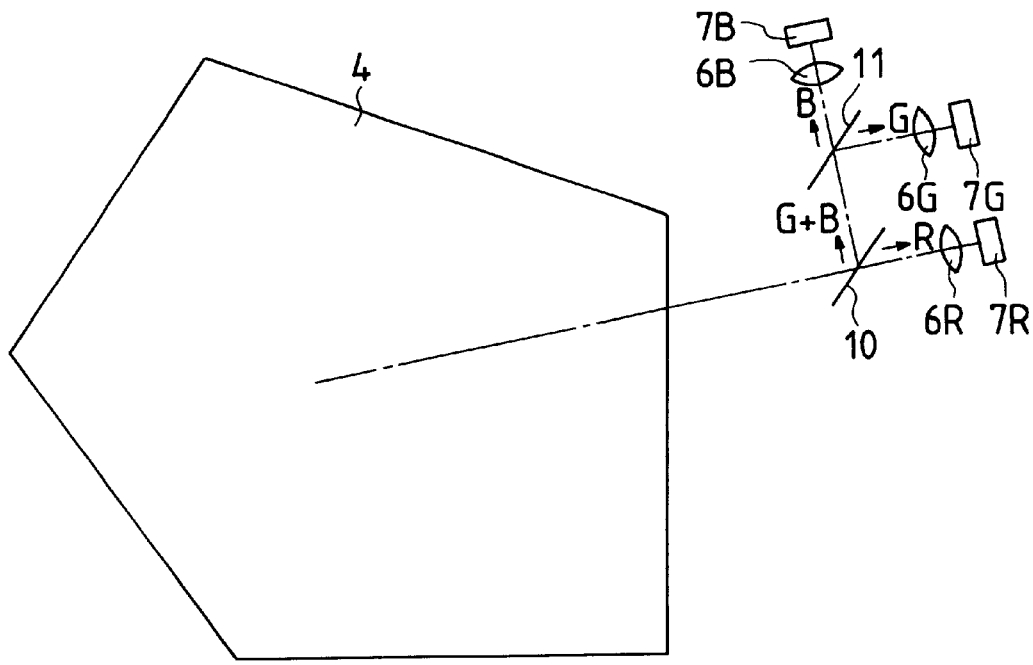
FIG. 14 is a partial view showing still another arrangement of an optical system of the photometry device of the second embodiment.

FIG. 14 partially shows still another arrangement of the photometry optical system. In this arrangement, of light components emerging from the pentagonal prism 4, only an R component is transmitted through a dichroic mirror 10, and is photometrically measured by the photometry element 7R after it is focused by the photometry lens 6R. Then, of G and B components reflected by the dichroic mirror 10, the B component is transmitted through the next dichroic mirror 11, and is photometrically measured by the photometry element 7B after it is focused by the photometry lens 6B. Finally, the G component reflected by the dichroic mirror 11 is focused by the photometry lens 6G, and is photometrically measured by the photometry element 7G.

The outputs from the photometry sensors 7R, 7G, and 7B are each divided into nine values to obtain a total of 27 photometry outputs in units of three colors from nine areas, like in the first embodiment, as shown in FIG. 9. The following processing is executed according to the second embodiment or its modification.

In each of the above embodiments, R, G, and B three-color photometry outputs are obtained from each area. Alternatively, when the number of colors into which object light is to be separated is increased, photometry with higher precision can be realized, and the number of colors into which object light is to be separated can be determined in accordance with required performance.

In the device of the second embodiment, a photometry element which divides object light into a plurality of color components in units of a plurality of divided areas is arranged, and photometry is performed using maximum values of the divided areas. Therefore, even in a scene including many single color components such as red, blue, and the like, photometry with good color reproducibility can be realized without causing an overexposure.

Since a color output corresponding to the maximum value of each area is used as a luminance value of the corresponding area, a conventional multi-pattern photometry algorithm can be adopted without any modifications, and more precise photometry can be realized.

What is claimed is:

1. A photometry device of a camera, comprising:

photometry means for photometrically measuring object light while dividing the object light into a plurality of color components, and for outputting a plurality of photometry values, each corresponding respectively to the color components; and exposure control means for weighting the photometry values corresponding to the color components with a maximum one of the photometry values being preponderantly weighted to produce weighted photometry values, and for calculating an exposure control value based on the weighted photometry values corresponding to the color components.

2. A device according to claim 1, wherein the plurality of color components are three colors of red, green, and blue.

3. A device according to claim 1, wherein said exposure control means calculates the exposure amount based on a maximum one or the photometry values corresponding to the color components and controls at least one of a shutter speed and an aperture of the camera based on the exposure amount.

4. A photometry device of a camera having a photographing optical system, comprising:

a photometry device to divide object light incident from the photographing optical system into a plurality of color components, photometrically measuring the color components, and outputting a plurality of photometry values, each corresponding respectively to the color components; and an exposure controller to produce weighted photometry values by weighting the photometry values so that a maximum one of the photometry values is preponderantly weighted, and to calculate an exposure amount based on the weighted photometry values.

5. A photometry device according to claim 4, wherein said exposure controller calculates the exposure amount by preponderantly using the maximum one of the photometry values corresponding to the color components.

6. A device according to claim 4, wherein the plurality of color components are three colors of red, green, and blue.

7. A device according to claim 4, wherein the object light is divided into the plurality of color components using a color filter.

8. A device according to claim 4, wherein the object light is divided into the plurality of color components using a dichroic mirror.

9. A photometry device according to claim 4, wherein said photometry device divides a photographing field into a plurality of divided areas, measures photometrically the object light of each of the divided areas while dividing the object light into the plurality of color components, and outputs the plurality of photometry values corresponding to the plurality of color components of each of the divided areas, and wherein said exposure controller calculates the exposure control value using photometry values corresponding to the color components having maximum photometry values among the plurality of photometry values corresponding to the divided areas.

10. A device according to claim 9, wherein the plurality of color components are three colors of red, green, and blue.

11. A device according to claim 9, wherein the object light is divided into the plurality of color components using a color filter.

12. A device according to claim 9, wherein the object light is divided into the plurality of color components using a dichroic mirror.

13. A photometry device of a camera, comprising:

a photometry device to divide a photographing field into a plurality of divided areas, to measure photometrically object light of each of the divided areas while dividing the object light into a plurality of color components, and to output a plurality of photometry values corresponding to the plurality of color components of each of the divided areas; and an exposure controller to weight and add the photometry values within each of the divided areas with a maximum one of the photometry values corresponding to the color components being preponderantly weighted to obtain representative photometry values of the divided areas, respectively, and to calculate the exposure control value based on the representative photometry values.

14. A device according to claim 13, wherein the plurality of color components are three colors of red, green, and blue.

15. A device according to claim 13, wherein the object light is divided into the plurality of color components using a color filter.

16. A device according to claim 13, wherein the object light is divided into the plurality of color components using a dichroic mirror.

17. A photometry device of a camera, comprising:

photometry means for photoelectrically measuring object light while dividing the object light into a plurality of color components, and for outputting a plurality of photometry values, each corresponding respectively to the color components; and exposure control means for weighting the plurality of photometry values corresponding to the color components to produce weighted photometry values, and for calculating an exposure control value to obtain reproducibility of a prominent color component having a corresponding photometry value given maximum weight among the weighted photometry values.

18. A photometry device of a camera having a photographing optical system, comprising:

a photometry device to divide object light incident from the photographing optical system into a plurality of color components, to measure photometrically the color components, and to output a plurality of photometry values, each corresponding respectively to the color components; and an exposure controller to calculate an exposure control value preponderantly using a maximum photometry value among the photometry values to obtain reproducibility of a prominent color component corresponding to the maximum photometry value.

* * * * *